United States Patent
Onoue et al.

(10) Patent No.: US 10,475,587 B2
(45) Date of Patent: Nov. 12, 2019

(54) FEEDTHROUGH CAPACITOR

(71) Applicant: TDK CORPORATION, Tokyo (JP)

(72) Inventors: Toru Onoue, Tokyo (JP); Daisuke Himeta, Tokyo (JP); Hikaru Hirabayashi, Tokyo (JP); Fumiaki Satoh, Tokyo (JP); Yuma Hattori, Tokyo (JP); Takuto Okamoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 27 days.

(21) Appl. No.: 15/903,976

(22) Filed: Feb. 23, 2018

(65) Prior Publication Data

US 2018/0286583 A1    Oct. 4, 2018

(30) Foreign Application Priority Data

Mar. 29, 2017    (JP) ................. 2017-065398

(51) Int. Cl.
*H01G 4/35*    (2006.01)
*H01G 4/232*    (2006.01)
*H01G 4/30*    (2006.01)

(52) U.S. Cl.
CPC ............. *H01G 4/35* (2013.01); *H01G 4/30* (2013.01)

(58) Field of Classification Search
CPC .......... H01G 4/232; H01G 4/30; H01G 4/228; H01G 4/35
See application file for complete search history.

(56) References Cited

U.S. PATENT DOCUMENTS

| | | | |
|---|---|---|---|
| 2009/0034152 A1* | 2/2009 | Aoki ............... | H01G 4/005 361/301.4 |
| 2011/0157767 A1* | 6/2011 | Hur ................. | H01G 4/008 361/305 |
| 2014/0151101 A1 | 6/2014 | Lee et al. | |

FOREIGN PATENT DOCUMENTS

| | | | |
|---|---|---|---|
| CN | 101359533 | | 2/2009 |
| CN | 103854852 | | 6/2014 |
| JP | 2000049034 A | * | 2/2000 |
| JP | 2002-237429 A | | 8/2002 |

* cited by examiner

*Primary Examiner* — Eric W Thomas
(74) *Attorney, Agent, or Firm* — Oliff PLC

(57) ABSTRACT

A first external electrode is disposed on an end surface. A second external electrode is disposed on a side surface. The first external electrode includes a first sintered electrode layer, a second sintered electrode layer disposed on the first sintered electrode layer, and a plated layer disposed on the second sintered electrode layer. The second external electrode includes a third sintered electrode layer and a plated layer disposed on the third sintered electrode layer. The first, second, and third sintered electrode layers include a void. A void fraction of each of the first and third sintered electrode layers is larger than a void fraction of the second sintered electrode layer.

4 Claims, 9 Drawing Sheets

FEEDTHROUGH CAPACITOR

BACKGROUND OF THE INVENTION

1. Field of the Invention

The present invention relates to a feedthrough capacitor.

2. Description of Related Art

Known feedthrough capacitors include an element body, a pair of first external electrodes, a second external electrode, a first internal electrode, and a second internal electrode (e.g., see Japanese Unexamined Patent Publication No. 2002-237429). The element body includes a pair of end surfaces opposing each other, and at least one side surface located between the pair of end surfaces. Each of the first external electrodes is disposed on the corresponding end surface. The second external electrode is spaced apart from the pair of first external electrodes and disposed on the side surface. The first internal electrode is disposed in the element body and includes a pair of first portions exposed to the corresponding end surface. The second internal electrode is disposed in the element body to oppose the first internal electrode and includes a second portion exposed to the side surface. Each of the first external electrodes covers the corresponding first portion and is connected to the corresponding first portion. The second external electrode covers the second portion and is connected to the second portion. For example, the first external electrode functions as a signal external electrode, and the first internal electrode functions as a signal internal electrode. For example, the second external electrode functions as a ground external electrode, and the second internal electrode functions as a ground internal electrode.

SUMMARY OF THE INVENTION

An object of an aspect of the present invention is to provide a feedthrough capacitor in which cracking tends not to occur in an element body and an external electrode tends not to be separated from the element body, without increasing a resistance.

As a result of investigation and research, the inventors of the present invention have discovered the following new facts.

In general, each external electrode of a feedthrough capacitor includes a sintered electrode layer and a plated layer. The plated layer is disposed on the sintered electrode layer. The sintered electrode layer is formed by heating conductive paste. The conductive paste contains metallic particles and an organic vehicle. When the conductive paste is heated, an organic binder contained in the organic vehicle is decomposed and the organic binder is gasified. The generated gas is discharged to the outside through the metallic particles. A part of the gas is not discharged to the outside and forms a void in the sintered electrode layer.

As the distribution of metallic particles in the conductive paste is sparser, the metallic particles tend not to be bound together. Therefore, a void tends to be formed in the sintered electrode layer. As the distribution of metallic particles in the conductive paste is sparser, the ratio of the void (hereinafter referred to as a void fraction) to be formed in the sintered electrode layer is larger. As the distribution of metallic particles in the conductive paste is denser, the metallic particles tend to be bound together. Therefore, the void fraction in the sintered electrode layer is small.

The plated layer is formed by performing plating processing on the sintered electrode layer. In the plating processing, a plating solution may infiltrate into the element body. When the plating solution is present in the element body, for example, in a state where a voltage is applied to the feedthrough capacitor, cracking may occur in the element body. The internal electrode includes an end exposed to the surface of the element body. The plating solution passes through the void formed in the sintered electrode layer and reaches the end of the internal electrode. The plating solution which has reached the end of the internal electrode passes through between the internal electrode and the element body and infiltrates into the element body. As the void fraction in the sintered electrode layer decreases, a path through which the plating solution reaches the end of the internal electrode tends not to be formed. When the void fraction in the sintered electrode layer is reduced, the occurrence of cracking in the element body is suppressed. In this case, the reliability of the feedthrough capacitor is improved.

In the heating process, head is transferred into the conductive paste from the surface of the conductive paste. Therefore, binding of metallic particles is started from metallic particles located on the surface of the conductive paste or metallic particles located in the vicinity of the surface of the conductive paste. In the conductive paste in which the distribution of metallic particles is dense, the metallic particles tend to be bound together. Therefore, metallic particles located on the surface of the conductive paste or metallic particles located in the vicinity of the surface of the conductive paste may be bound together before the generated gas is released from the conductive paste. From the viewpoint of suppressing infiltration of the plating solution, when the conductive paste in which the distribution of metallic particles is dense is used to reduce the void fraction in the sintered electrode layer, the generated gas may be accumulated between the conductive paste and the element body. In other words, the generated gas tends to be stagnant between the sintered electrode layer and the element body. When the gas is stagnant between the sintered electrode layer and the element body, a bonding area between the external electrode and the element body is reduced. In this case, the external electrode tends to be separated from the element body, resulting in deterioration in production yield of products.

When the width of the end of the internal electrode is reduced, the path through which the plating solution infiltrates is narrowed. In this case, infiltration of the plating solution into the element body is suppressed. However, when the width of the first portion of the first internal electrode is reduced, a connection area between the first internal electrode and the first external electrode is reduced. In this case, the resistance of the feedthrough capacitor increases.

Next, the inventors of the present invention have conducted intensive research on the configuration in which cracking tends not to occur in the element body and an external electrode tends not to be separated from the electrode body, without increasing the resistance.

As a result of research, the inventors of the present invention have discovered a feedthrough capacitor having the following configuration.

A first external electrode includes a first sintered electrode layer covering a first portion of a first internal electrode, and a second sintered electrode layer disposed on the first sintered electrode layer. A second external electrode includes a third sintered electrode layer covering a second portion of a second internal electrode. A void fraction of each of the first and third sintered electrode layers is larger than a void fraction of the second sintered electrode layer.

In the feedthrough capacitor having the configuration described above, the void fraction of each of the first and third sintered electrode layers is larger than the void fraction of the second sintered electrode layer. In this case, a conductive paste in which a distribution of metallic particles is sparser than that of a conductive paste used to form the second sintered electrode layer can be used to form the first and third sintered electrode layers. As the distribution of metallic particles is sparser, a gas generated when the conductive paste is heated tends to pass through between the metallic particles. In this case, the gas tends not to be stagnant between the first and third sintered electrode layers and an element body. Therefore, the bonding area between the first and second external electrode and the element body is secured. The first external electrode and the second external electrode tend not to be separated from the element body. When the first external electrode and the second external electrode tend not to be separated from the element body, the production yield of the feedthrough capacitor is improved. In the first external electrode, the second sintered electrode layer that has a void fraction smaller than the void fraction of the first sintered electrode layer is disposed on the first sintered electrode layer. Therefore, infiltration of a plating solution into the element body is suppressed without increasing a resistance of the feedthrough capacitor. Consequently, in the feedthrough capacitor having the configuration described above, cracking tends not to occur and the external electrode tends not to be separated from the element body, without increasing the resistance.

A feedthrough capacitor according to a first aspect of the present invention includes an element body, a pair of first external electrodes, a second external electrode, a first internal electrode, and a second internal electrode. The element body includes a pair of end surfaces opposing each other, and at least one side surface located between the pair of end surfaces. The pair of first external electrodes are disposed on the pair of end surfaces, respectively. The second external electrode is spaced apart from the pair of first external electrodes and is disposed on the side surface. The first internal electrode is disposed in the element body, and includes a pair of first portions exposed to the pair of end surfaces. The second internal electrode is disposed in the element body to oppose the first internal electrode, and includes a second portion exposed to the side surface. Each of the first external electrodes includes a first sintered electrode layer, a second sintered electrode layer, a plated layer. The first sintered electrode layer covers the corresponding first portion and is connected to the corresponding first portion. The second sintered electrode layer is disposed on the first sintered electrode layer. The plated layer is disposed on the second sintered electrode layer. The second external electrode includes a third sintered electrode layer and a plated layer disposed on the third sintered electrode layer. The third sintered electrode layer covers the second portion and is connected to the second portion. The first, second, and third sintered electrode layers include a void. A void fraction of each of the first and third sintered electrode layers is larger than a void fraction of the second sintered electrode layer.

In the aspect described above, each of the first external electrodes includes the first sintered electrode layer and the second sintered electrode layer, and the second external electrode includes the third sintered electrode layer. The void fraction of each of the first and third sintered electrode layers is larger than the void fraction of the second sintered electrode layer. Therefore, the aspect described above provides the feedthrough capacitor in which cracking tends not to occur in the element body and the external electrode tends not to be separated from the element body, without increasing the resistance.

In the aspect described above, the void fraction of each of the first and third sintered electrode layers may be 0.2 to 1.0%. The void fraction of the second sintered electrode layer may be 0.02 to 0.18%. In this case, this configuration provides the feedthrough capacitor in which cracking further tends not to occur in the element body and the external electrode further tends not to be separated from the element body.

In the aspect described above, a width of the second portion may be smaller than a width of each of the first portions. In general, as a width of a portion of the internal electrode that is exposed from the element body decreases, a path through which a plating solution infiltrates is narrower, so that infiltration of the plating solution into the element body is suppressed. When the width of the second portion is smaller than the width of the first portion, infiltration of the plating solution into the element body is suppressed as compared with when the width of the second portion is equal to or more than the width of the first portion. When the width of the first portion is larger than the width of the second portion, a connection area between the first external electrode and the first internal electrode is secured as compared with when the width of the first portion is equal to or less than the width of the second portion. Therefore, this configuration suppresses an increase in resistance and further suppresses the occurrence of cracking.

In the aspect described above, each of the first external electrodes may include a first conductor portion located on the corresponding end surface. The second external electrode may include a second conductor portion located on the side surface. A surface area of the second conductor portion may be smaller than a surface area of the first conductor portion. A surface roughness of the second conductor portion may be larger than a surface roughness of the first conductor portion. When the feedthrough capacitor is solder-mounted on an electronic device (e.g., a circuit board or electronic component), a force may act on a bonding portion between the electronic device and the first external electrode and on a bonding portion between the electronic device and the second external electrode. When the surface area of the second conductor portion is smaller than the surface area of the first conductor portion, the force per unit area acting on the bonding portion between the electronic device and the second external electrode tends to be larger than the force per unit area acting on the bonding portion between the electronic device and the first external electrode, as compared with when the surface area of the second conductor portion is equal to or more than the surface area of the first conductor portion. When the surface roughness of the second conductor portion is larger than the surface roughness of the first conductor portion, a bonding strength of bonding between the second external electrode and the solder is larger than a bonding strength of bonding between the first external electrode and the solder, as compared with when the surface roughness of the second conductor portion is equal to or less than the surface roughness of the first conductor portion. Therefore, even when the force per unit area acting on the bonding portion between the electronic device and the second external electrode is larger than the force per unit area acting on the bonding portion between the electronic device and the first external electrode, the feedthrough capacitor tends not to be separated from the electronic device. When the surface roughness of the second conductor portion is larger than the surface roughness of the first conductor portion, the melted solder tends not to climb up the second external electrode, as compared with a case where the surface roughness of the second conductor portion is equal to or less than the surface roughness of the first conductor portion. When the melted solder tends not to climb up the second external electrode, the size of a solder fillet formed on the second external electrode is small, as compared with when the melted solder tends to climb up the second external electrode. Therefore, this configuration reduces a packaging density of the feedthrough capacitor in a direction crossing the side surface.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
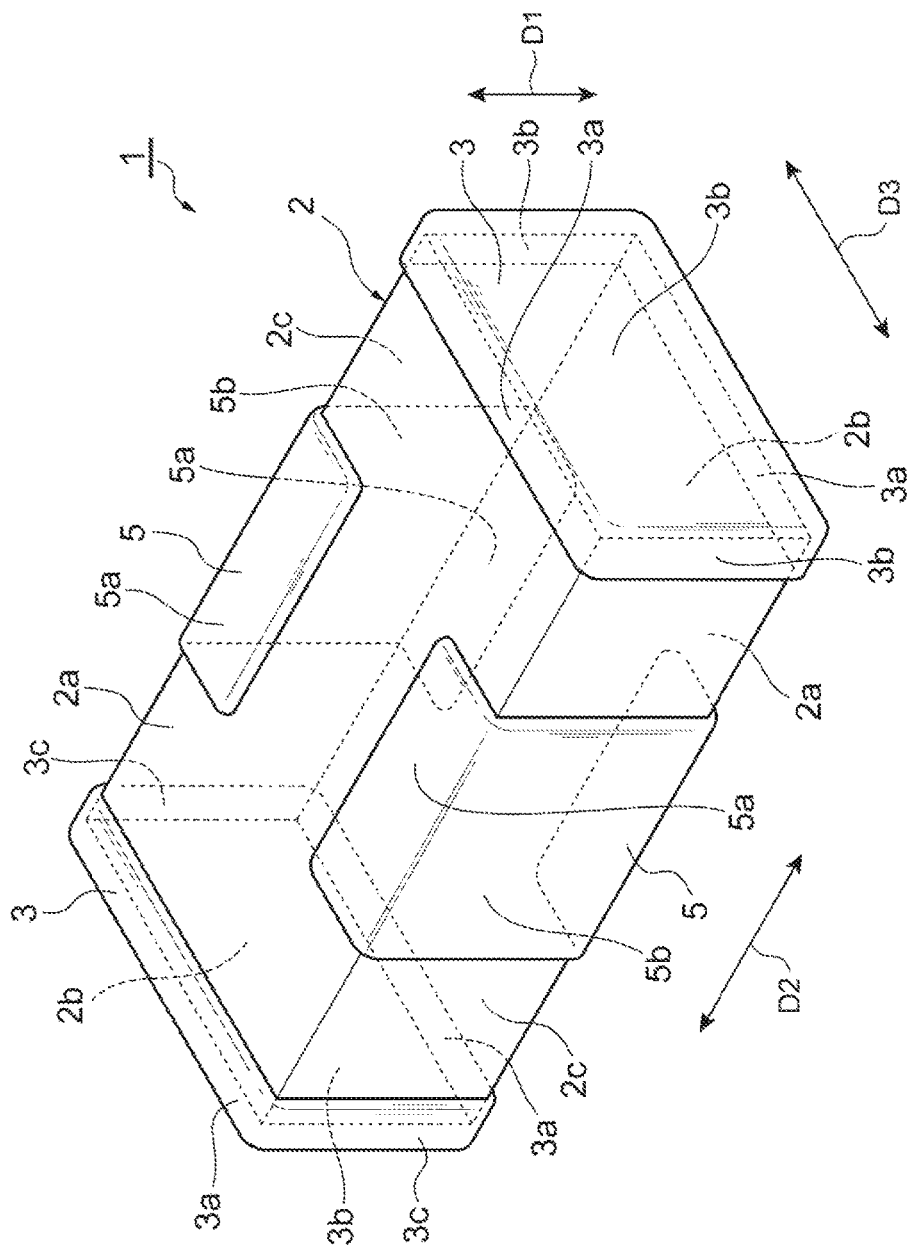
FIG. 1 is a perspective view illustrating a feedthrough capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

A configuration of a feedthrough capacitor 1 according to an embodiment will be described with reference to FIGS. 1 to 5. FIG. 1 is a perspective view illustrating the feedthrough capacitor according to this embodiment. FIGS. 2 to 5 are diagrams each illustrating a sectional configuration of the feedthrough capacitor. As illustrated in FIGS. 1 to 5, the feedthrough capacitor 1 includes an element body 2, a pair of external electrodes 3, a pair of external electrodes 5, a plurality of internal electrodes 7, and a plurality of internal electrodes 9. The pair of external electrodes 3 is disposed on a surface of the element body 2. The pair of external electrodes 5 is disposed on the surface of the element body 2 and is located between the pair of external electrodes 3. The plurality of internal electrodes 7 is disposed in the element body 2. The plurality of internal electrodes 9 is disposed in the element body 2 and opposes the respective internal electrodes 7.

The element body 2 has a rectangular parallelepiped shape. The element body 2 includes a pair of principal surfaces 2a opposing each other, a pair of end surfaces 2b opposing each other, and a pair of side surfaces 2c opposing each other. The pair of principal surfaces 2a opposes each other in a first direction D1. The pair of end surfaces 2b opposes each other in a second direction D2. The pair of side surfaces 2c opposes each other in a third direction D3. The length of the element body 2 in the second direction D2 and the length of the element body 2 in the third direction D3 are longer than the length of the element body 2 in the first direction D1. The length of the element body 2 in the second direction D2 is longer than the length of the element body 2 in the third direction D3. The area of each of the principal surfaces 2a is larger than the area of each of the end surfaces 2b and the area of each of the side surfaces 2c. The area of each of the side surfaces 2c is larger than the area of each of the end surfaces 2b. The first direction D1 corresponds to the height direction of the element body 2. The second direction D2 corresponds to the longitudinal direction of the element body 2. The third direction D3 corresponds to the width direction of the element body 2.

The rectangular parallelepiped shape includes a shape of a rectangular parallelepiped in which corner portions and ridge portions are chamfered, and a shape of a rectangular parallelepiped in which corner portions and ridge portions are rounded. The length of the element body 2 in the first direction D1 is, for example, 600 μm. The length of the element body 2 in the second direction D2 is, for example, 1600 μm. The length of the element body 2 in the third direction D3 is, for example, 800 μm.

The element body 2 is configured by laminating a plurality of dielectric layers in the first direction D1. The element body 2 includes a plurality of laminated dielectric layers. In the element body 2, a lamination direction of the plurality of dielectric layers coincides with the first direction D1. Each of the dielectric layers includes, for example, a sintered body of a ceramic green sheet containing a dielectric material. The dielectric material includes, for example, $BaTiO_3$-based, $Ba(Ti, Zr)O_3$-based, or $(Ba, Ca)TiO_3$-based dielectric ceramics. In the actual element body 2, individual dielectric layers are integrated to such an extent that the boundary between the dielectric layers cannot be visually recognized.

As illustrated in FIG. 1, each of the pair of external electrodes 3 is disposed on the corresponding end surface 2b. The pair of external electrodes 3 is spaced apart from each other in the second direction D2. The pair of external electrodes 3 opposes each other in the second direction D2. Each of the external electrodes 3 includes a pair of conductor portions 3a, a conductor portion 3b, and a pair of conductor portions 3c. One of the conductor portions 3a is disposed on one of the principal surfaces 2a, and another one of the conductor portions 3a is disposed on another one of the principal surfaces 2a. The conductor portion 3b is disposed on the corresponding end surface 2b. One of the conductor portions 3c is disposed on one of the side surfaces 2c, and another one of the conductor portions 3c is disposed on another one of the side surfaces 2c. The conductor portions 3a, 3b, and 3c are connected together. Each of the pair of external electrodes 3 functions as, for example, a signal external electrode.

Figure 2:
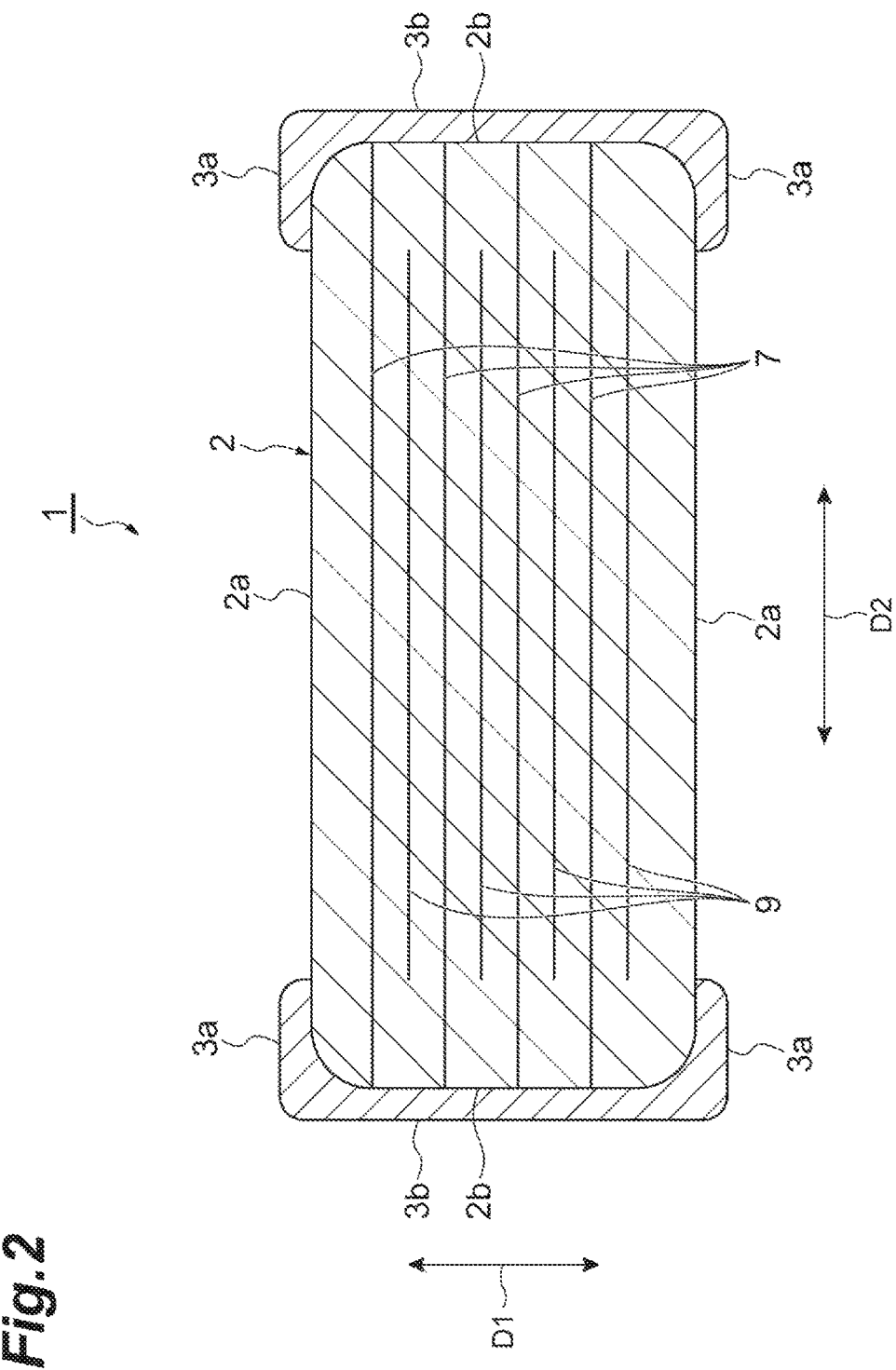
FIG. 2 is a diagram illustrating a sectional configuration of the feedthrough capacitor.

Each of the conductor portions 3b covers the entirety of the corresponding end surfaces 2b. In this embodiment, as illustrated in FIGS. 1 and 2, at both ends of the element body 2, the conductor portions 3a and the conductor portions 3c cover the entire region from each end surface 2b to a position where the length from the corresponding end surface 2b in the second direction D2 is 0.25 mm.

As illustrated in FIG. 1, the pair of external electrodes 5 is spaced apart from the pair of external electrodes 3 and is disposed between the pair of external electrodes 3. The pair of external electrodes 5 is disposed in a middle portion of the element body 2 in the second direction D2. The pair of external electrodes 5 is spaced apart from each other and opposes each other in the third direction D3. Each of the external electrodes 5 includes a pair of conductor portions 5a and a conductor portion 5b. One of the conductor portions 5a is disposed on one of the principal surfaces 2a, and another one of the conductor portions 5a is disposed on the other one of the principal surfaces 2a. The conductor portion 5b is disposed on the side surface 2c. The conductor portions 5a and 5b are connected together. Each of the pair of external electrodes 5 functions as, for example, a ground external electrode.

As illustrated in FIG. 1, the conductor portion 5b is located in a middle portion of each side surface 2c in the second direction D2. The conductor portion 5b has a predetermined length (predetermined width) in the second direction D2 and covers the entire region sandwiched between the ends of the pair of principal surfaces 2a in the first direction D1. Each of the conductor portions 5a extends from an end of each side surface 2c in the third direction D3. The surface area of the conductor portion 5b is smaller than the surface area of the conductor portion 3b. The length of the conductor portion 5b in the second direction D2 is, for example, 0.48 mm. The length of the conductor portion 5a in the third direction D3 is, for example, 0.2 mm.

The surface roughness of each of the external electrodes 5 is larger than the surface roughness of each of the external electrodes 3. In this embodiment, the surface roughness of the conductor portion 5b is larger than the surface roughness of the conductor portion 3b. The surface roughness is represented by, for example, an arithmetic average roughness (Ra). The arithmetic average roughness (Ra) is defined in JIS B 0601:2013 (ISO 4287:1997). The surface roughness of each of the external electrodes 5 (conductor portion 5b) is, for example, 1500 to 4000 nm. The surface roughness of each of the external electrodes 3 (conductor portion 3b) is, for example, 400 to 2000 nm.

Figure 3:
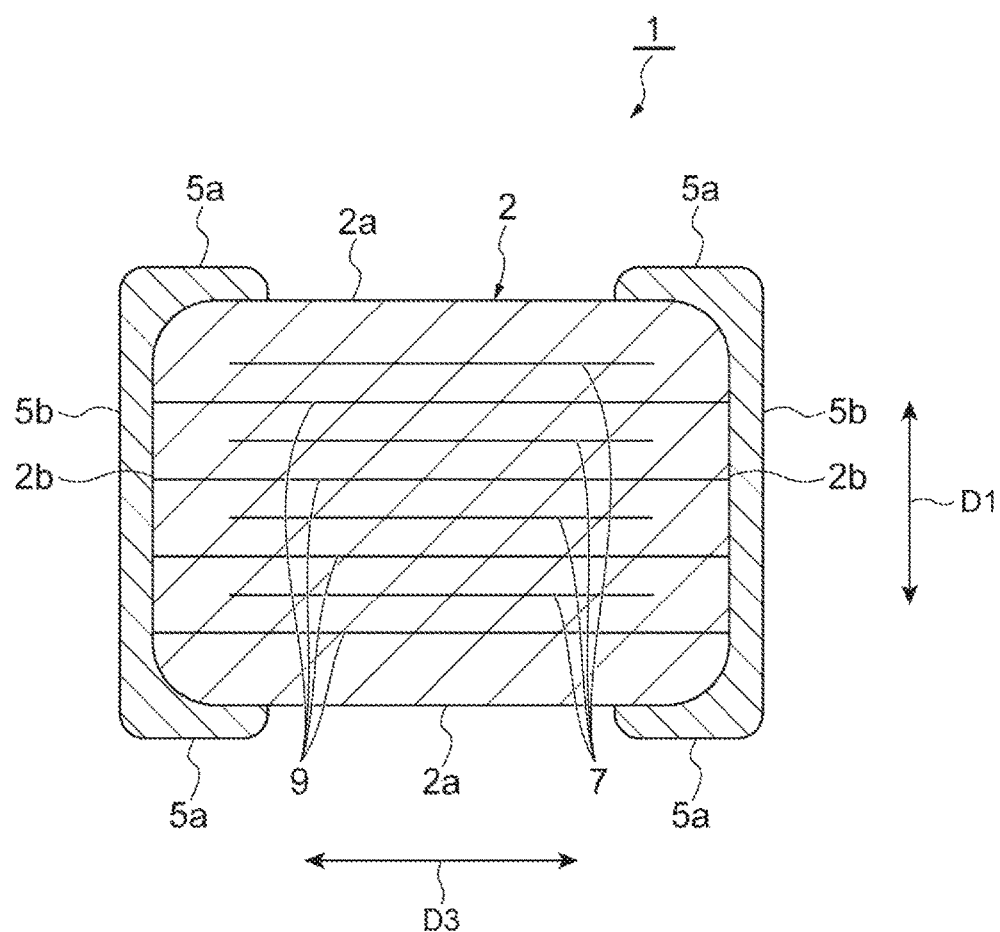
FIG. 3 is a diagram illustrating a sectional configuration of the feedthrough capacitor.

FIG. 2 is a sectional view of the feedthrough capacitor 1 taken along a plane that is parallel to the pair of side surfaces 2c and is located at an equal distance from the pair of side surfaces 2c. FIG. 3 is a sectional view of the feedthrough capacitor 1 taken along a plane that is parallel to the pair of end surfaces 2b and is located at an equal distance from the pair of end surfaces 2b. As illustrated in FIGS. 2 and 3, the internal electrodes 7 and the internal electrodes 9 are disposed in different positions (layers) of the element body 2 in the first direction D1. The internal electrodes 7 and the internal electrodes 9 are disposed to oppose each other at an interval in the first direction D1 within the element body 2. Each of the internal electrodes 7 functions as, for example, a signal internal electrode. Each of the internal electrodes 9 functions as, for example, a ground internal electrode.

Figure 4:
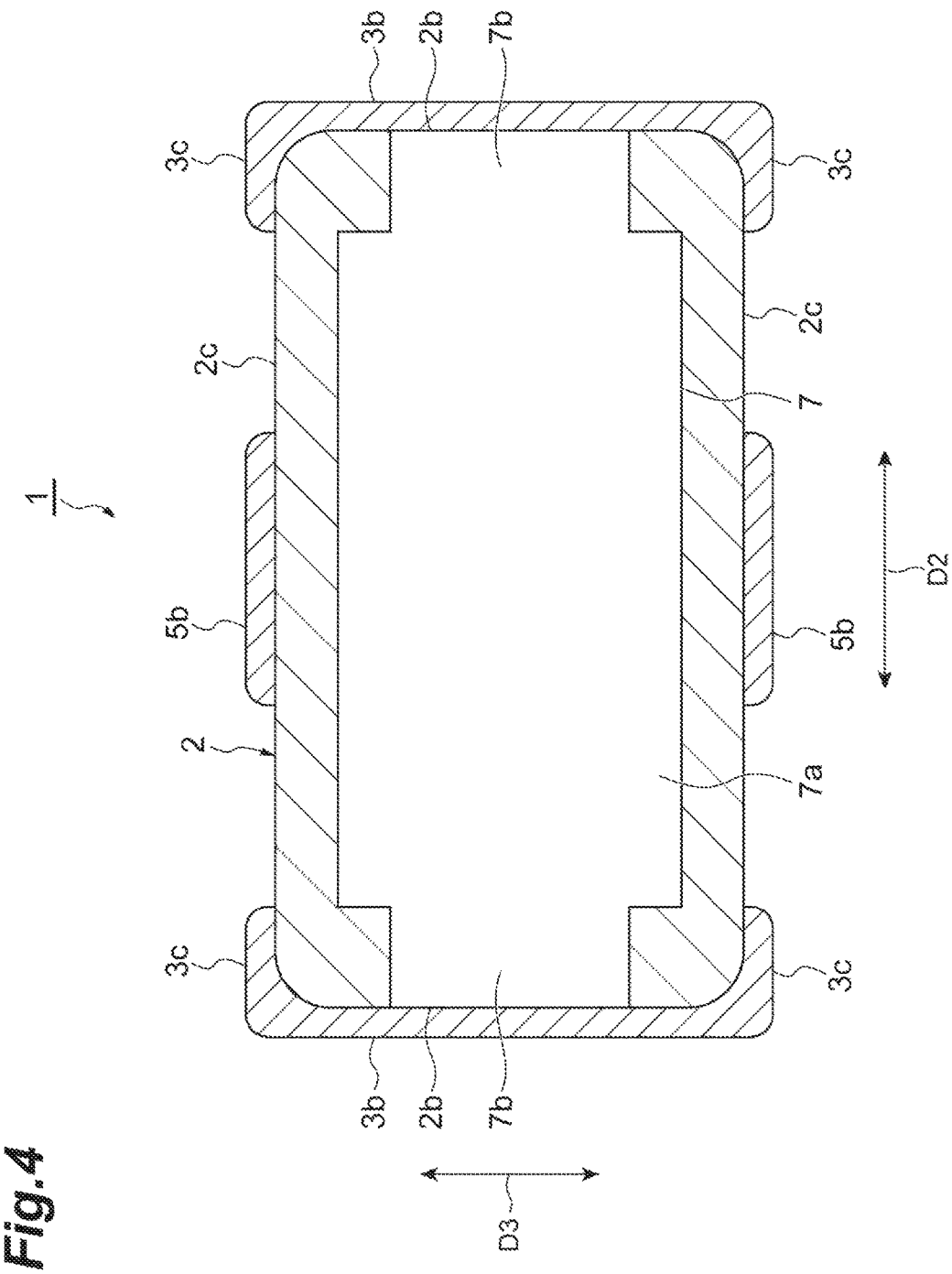
FIG. 4 is a diagram illustrating a sectional configuration of the feedthrough capacitor.

FIG. 4 is a sectional view of the feedthrough capacitor 1 taken along a plane that is parallel to the pair of principal surfaces 2a and at which one of the internal electrodes 7 is exposed. As illustrated in FIG. 4, each of the internal electrodes 7 includes a main electrode portion 7a having a rectangular shape, and a pair of connecting portions 7b. The long-side direction of the main electrode portion 7a coincides with the second direction D2. The short-side direction of the main electrode portion 7a coincides with the third direction D3. Each of the connecting portions 7b extends in the second direction D2 from a short side of the main electrode portion 7a and is exposed to the corresponding end surface 2b. Each of the internal electrodes 7 (each connecting portion 7b) includes a pair of first portions exposed to the corresponding end surface 2b. The main electrode portion 7a is integrally formed with the pair of connecting portions 7b.

Each of the internal electrodes 7 is exposed to the pair of end surfaces 2b and is not exposed to the pair of principal surfaces 2a and the pair of side surfaces 2c. Each of the internal electrodes 7 is connected to the corresponding external electrode 3 at the corresponding end surface 2b. A minimum length (minimum width) of each of the internal electrodes 7 in the third direction D3 is, for example, 200 μm or more. In this embodiment, the length of the first portion of each of the connecting portions 7b in the third direction D3 is the minimum length of each of the internal electrodes 7 in the third direction D3.

Figure 5:
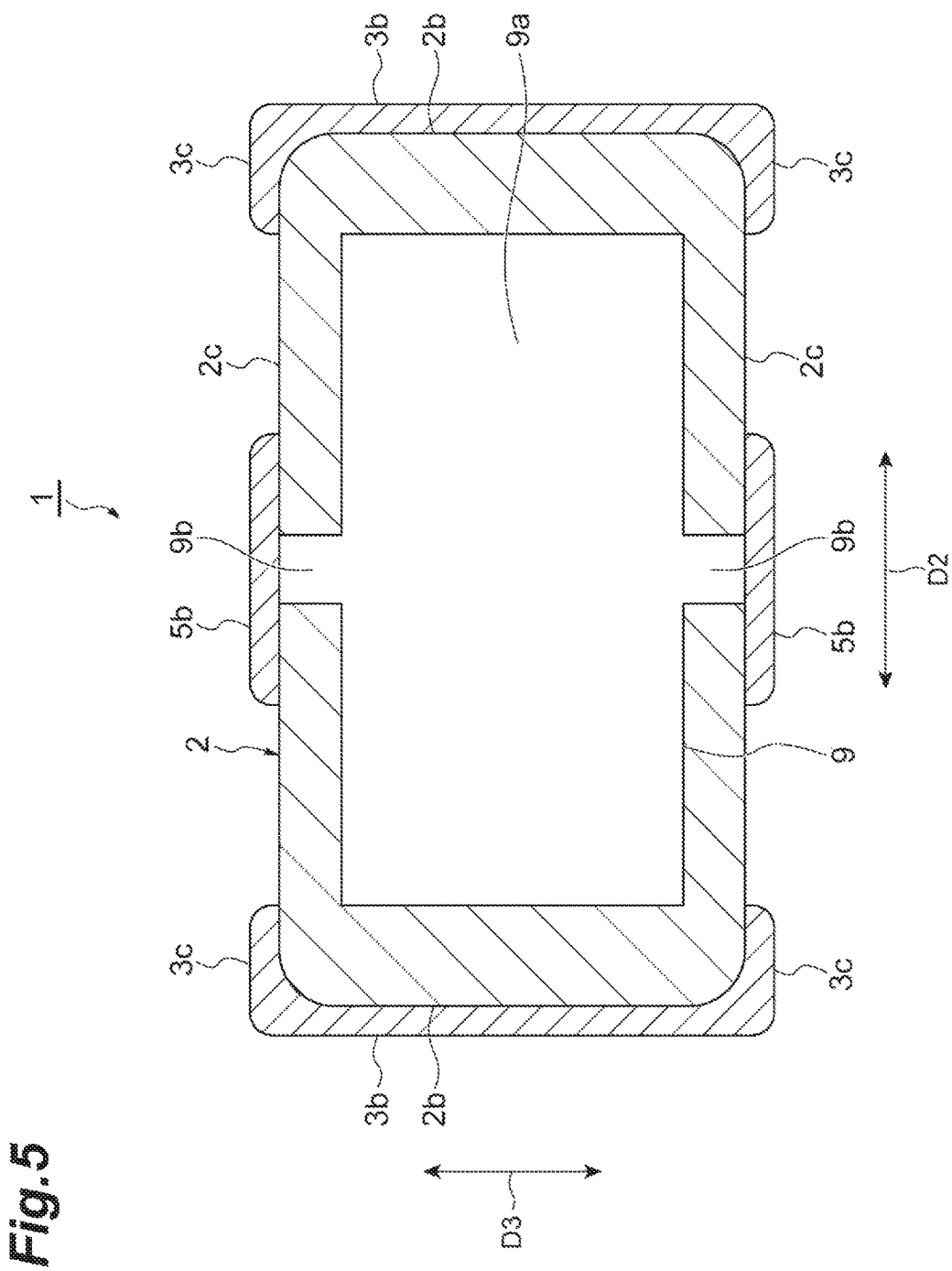
FIG. 5 is a diagram illustrating a sectional configuration of the feedthrough capacitor.

FIG. 5 is a sectional view of the feedthrough capacitor 1 taken along a plane that is parallel to the pair of principal surfaces 2a and at which one of the internal electrodes 9 is exposed. Each of the internal electrodes 9 opposes the corresponding internal electrode 7 in the first direction D1 in such a manner that a part (dielectric layer) of the element body 2 is interposed between the internal electrodes 9 and the internal electrodes 7. As illustrated in FIG. 5, each of the internal electrodes 9 incudes a main electrode portion 9a having a rectangular shape, and a pair of connecting portions 9b. The long-side direction of the main electrode portion 9a corresponds to the second direction D2. The short-side direction of the main electrode portion 9a corresponds to the third direction D3. Each of the connecting portions 9b extends in the third direction D3 from a long side of the main electrode portion 9a and is exposed to the corresponding side surface 2c. Each of the internal electrodes 9 (each connecting portion 9b) includes a pair of second portions exposed to the corresponding side surface 2c. The main electrode portion 9a and the pair of connecting portions 9b are integrally formed.

Each of the internal electrodes 9 is exposed to the pair of side surfaces 2c and is not exposed to the pair of principal surfaces 2a and the pair of end surfaces 2b. Each of the internal electrodes 9 is connected to the corresponding external electrode 5 at the corresponding side surface 2c. The minimum length (minimum width) of each of the internal electrodes 9 in the second direction D2 is smaller than the minimum length of each of the internal electrodes 7 in the third direction D3. The minimum length of each of the internal electrodes 9 in the second direction D2 is, for example, 50 μm or more. In this embodiment, the length of the second portion of each of the connecting portion 9b in the second direction D2 is the minimum length of each of the internal electrodes 9 in the second direction D2. The width (length in the second direction D2) of the second portion of each of the internal electrodes 9 (connecting portion 9b) is smaller than the width (length in the second direction D2) of the first portion of each of the internal electrodes 7 (connecting portion 7b). A connection area between each external electrode 3 and the internal electrode 7 is larger than a connection area between each external electrode 5 and each internal electrode 9.

The internal electrodes 7 and the internal electrodes 9 are each made of a conductive material (e.g., Ni or Cu) that is generally used as an internal electrode of a multilayer electronic component. Each of the internal electrodes 7 and internal electrodes 9 includes a sintered body of conductive paste containing the above-mentioned conductive material. In this embodiment, the thickness of each of the internal electrodes 7 is substantially the same as the thickness of each of the internal electrodes 9.

Figure 6:
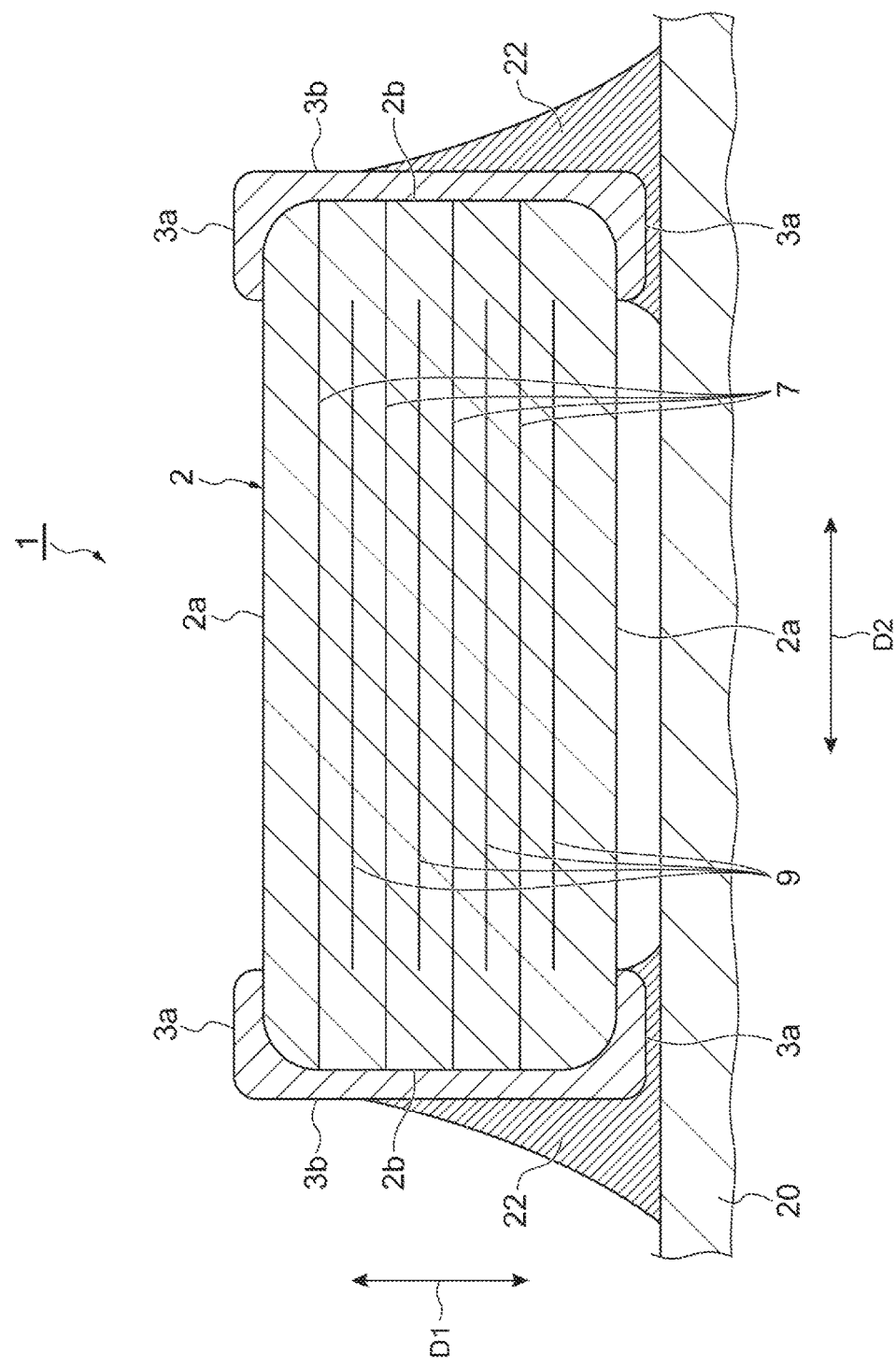
FIG. 6 is a diagram illustrating a configuration in which the feedthrough capacitor is mounted.
Figure 7:
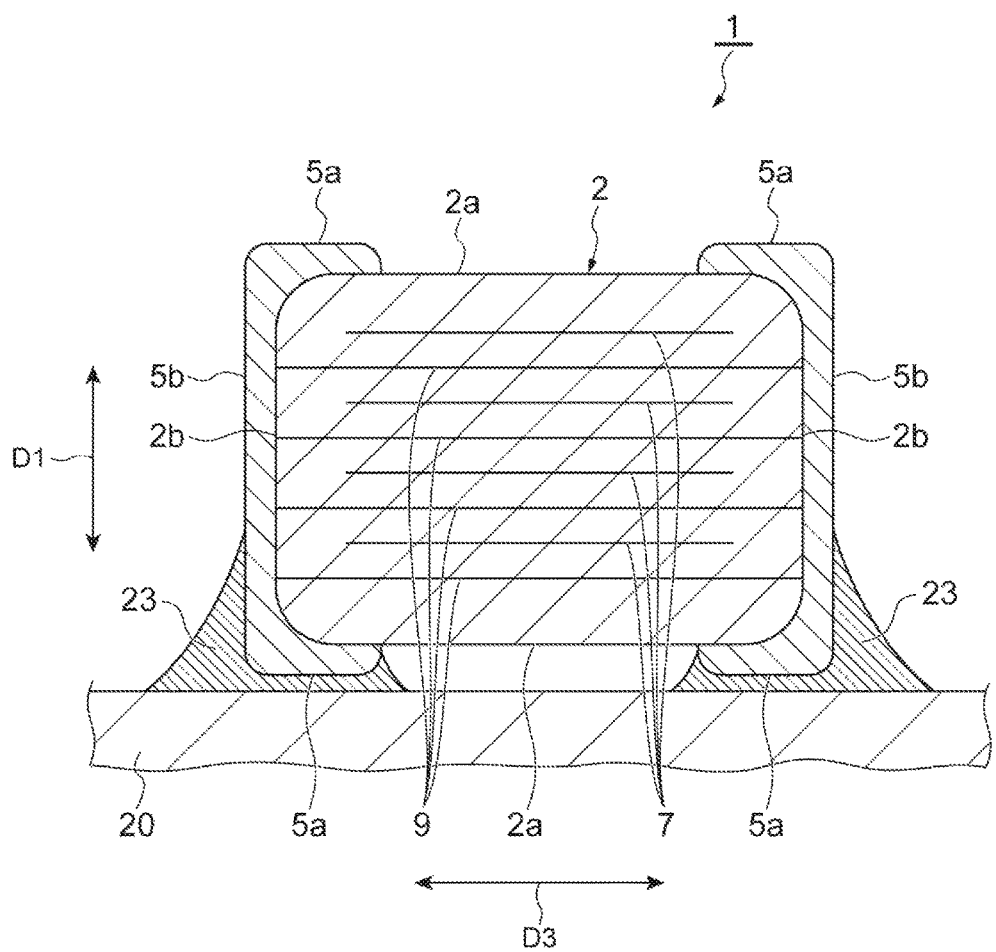
FIG. 7 is a diagram illustrating a configuration in which the feedthrough capacitor is mounted.

As illustrated in FIGS. 6 and 7, the feedthrough capacitor 1 is solder-mounted on an electronic device (e.g., a circuit board or electronic component) 20. FIG. 6 is a sectional view of the feedthrough capacitor 1, which is mounted on the electronic device 20, taken along a plane that is parallel to the pair of side surfaces 2c and is located at an equal distance from the pair of side surfaces 2c. FIG. 7 is a sectional view of the feedthrough capacitor 1, which is mounted on the electronic device 20, taken along a plane that is parallel to the pair of end surfaces 2b and is located at an equal distance from the pair of end surfaces 2b.

One of the principal surfaces 2a is a mounting surface opposing the electronic device 20. A solder fillet 22 is formed between each of the external electrodes 3 and a pad electrode (not illustrated) of the electronic device 20. A solder fillet 23 is formed between each of the external electrodes 5 and a pad electrode (not illustrated) of the electronic device 20. The length of the solder fillet 23 in the first direction D1 is smaller than the length of the solder fillet 22 in the first direction D1. The length of the solder fillet 23 in the third direction D3 is smaller than the length of the solder fillet 22 in the second direction D2. The size of the solder fillet 23 is smaller than the size of the solder fillet 23.

Figure 8:
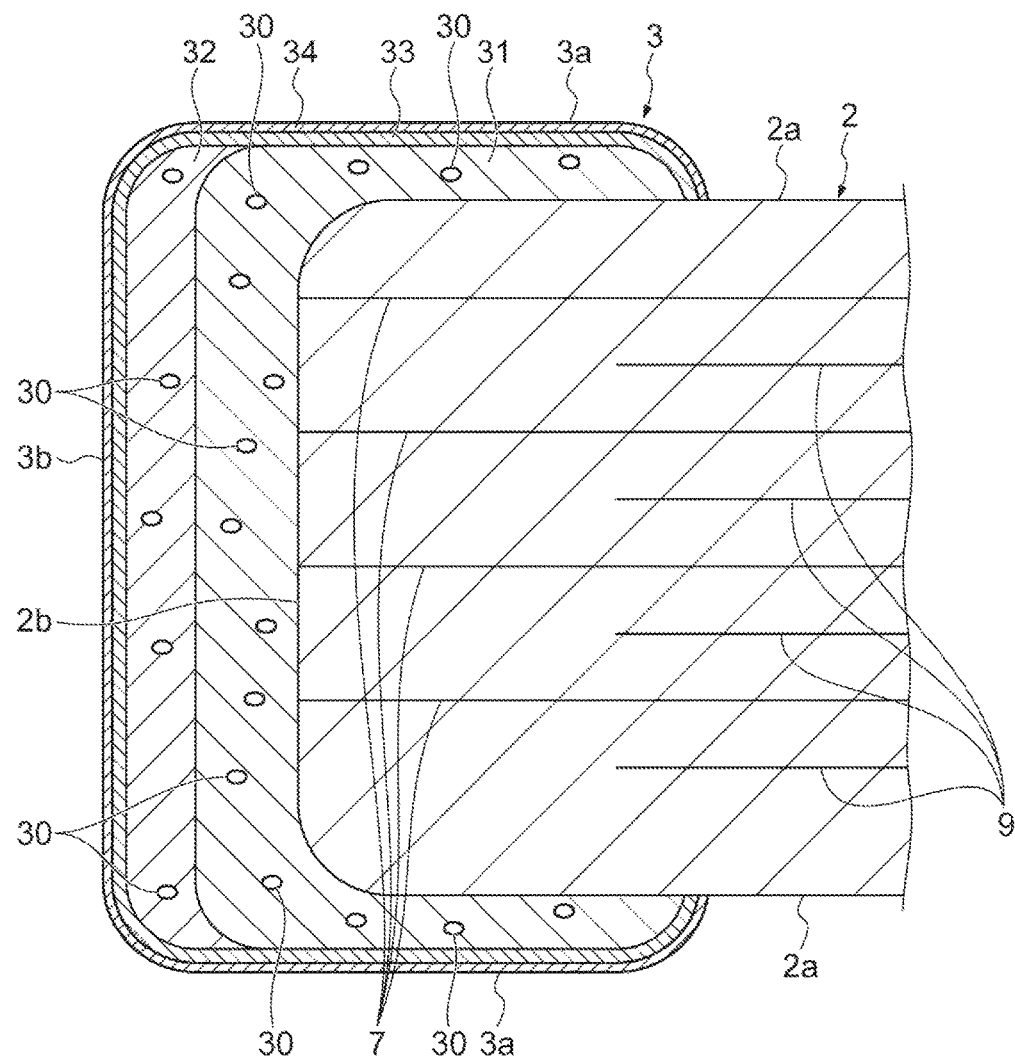
FIG. 8 is a schematic enlarged view of the feedthrough capacitor.
Figure 9:
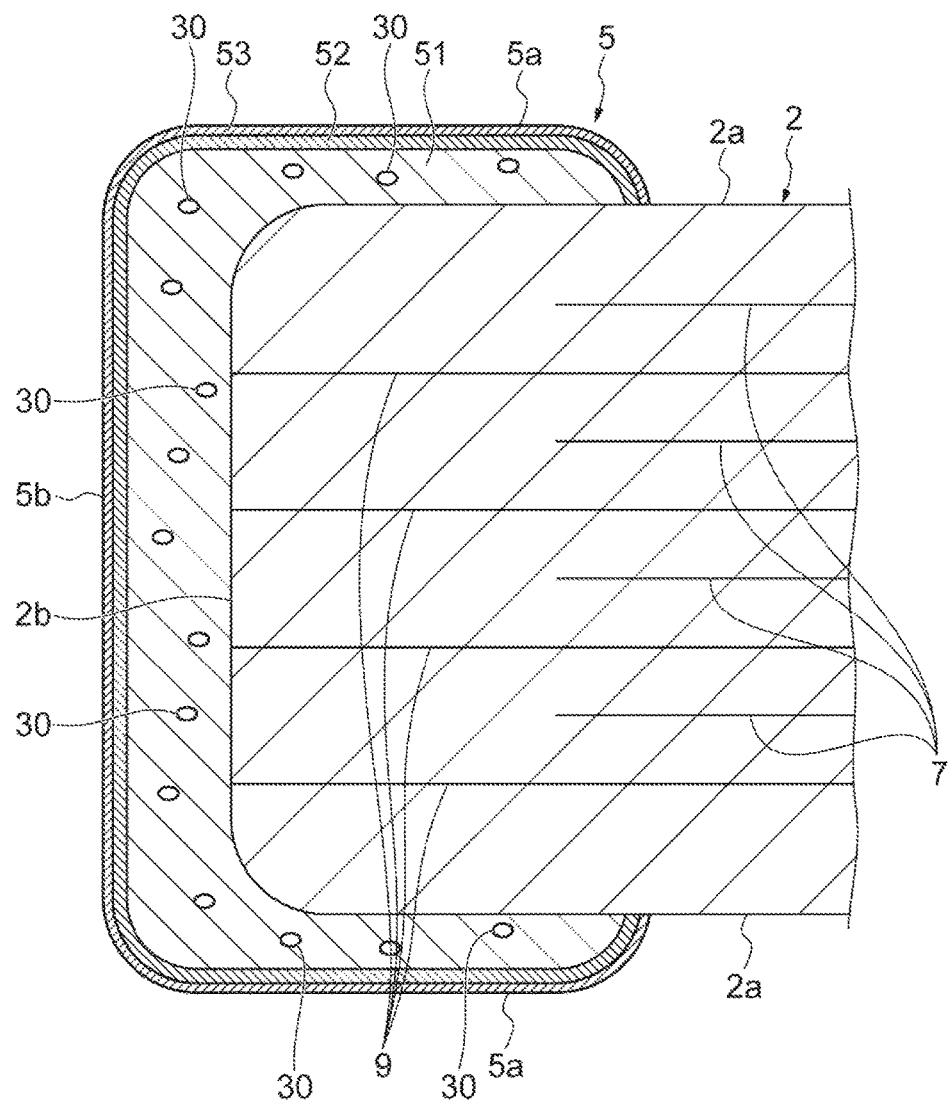
FIG. 9 is a schematic enlarged view of the feedthrough capacitor.

Next, the configurations of the external electrode 3 and the external electrode 5 will be described with reference to FIGS. 8 and 9, respectively. FIG. 8 is a diagram illustrating the configuration of the external electrode 3 illustrated in FIG. 2. FIG. 9 is a diagram illustrating the configuration of the external electrode 5 illustrated in FIG. 3.

As illustrated in FIG. 8, each of the external electrodes 3 includes a first sintered electrode layer 31, a second sintered electrode layer 32, a first plated layer 33, and a second plated layer 34. The first sintered electrode layer 31 covers the first portion of each of the internal electrodes 7 (connecting portion 7b). The first sintered electrode layer 31 is electrically and physically connected to each of the internal electrodes 7 (connecting portion 7b). The second sintered electrode layer 32 is disposed on the first sintered electrode layer 31. The first sintered electrode layer 31 is in contact with the entirety of the end surfaces 2b. The second sintered electrode layer 32 is in contact with a portion of the first sintered electrode layer 31 that is located on the corresponding end surface 2b. The second sintered electrode layer 32 is in contact with only a part of the first sintered electrode layer 31. The second sintered electrode layer 32 is located on the corresponding end surface 2b in a state where the first sintered electrode layer 31 is interposed between the second sintered electrode layer 32 and the corresponding end surface 2b. The second sintered electrode layer 32 indirectly covers the entirety of the end surfaces 2b. In this embodiment, an edge of a region of the first sintered electrode layer 31 that is in contact with the corresponding end surface 2b is separated from the first portion of each of the internal electrodes 7 (connecting portion 7b) by 30 µm or more. The average thickness of the first sintered electrode layer 31 on each end surface 2b is, for example, 15 to 35 µm. The average thickness of the second sintered electrode layer 32 on each end surface 2b is, for example, 5 to 20 µm.

The first plated layer 33 is formed on a sintered electrode layer that includes the first sintered electrode layer 31 and the second sintered electrode layer 32 by plating processing (e.g., electroplating processing). The entire surface of the sintered electrode layer that includes the first sintered electrode layer 31 and the second sintered electrode layer 32 is covered with the first plated layer 33. The second plated layer 34 is formed on the first plated layer 33 by plating processing (e.g., electroplating processing). The entire surface of the first plated layer 33 is covered with the second plated layer 34. The conductor portions 3a, 3b, and 3c include the first sintered electrode layer 31, the second sintered electrode layer 32, the first plated layer 33, and the second plated layer 34.

As illustrated in FIG. 9, each of the external electrodes 5 includes a third sintered electrode layer 51, a third plated layer 52, and a fourth plated layer 53. The third sintered electrode layer 51 covers the second portion of each of the internal electrodes 9 (connecting portion 9b). The third sintered electrode layer 51 is electrically and physically connected to each of the internal electrodes 9 (connecting portion 9b). The third sintered electrode layer 51 is in contact with the corresponding end surface 2b and is in contact with each of the principal surfaces 2a. In this embodiment, an edge of a region of the third sintered electrode layer 51 that is in contact with the side surfaces 2c is separated from the second portion of each of the internal electrodes 9 (connecting portion 9b) by 30 µm or more. The average thickness of the third sintered electrode layer 51 on each side surface 2c is, for example, 5 to 20 µm. The connection area between the first sintered electrode layer 31 and the internal electrode 7 is larger than the connection area between the third sintered electrode layer 51 and the internal electrode 9.

The third plated layer 52 is formed on the third sintered electrode layer 51 by plating processing (e.g., electroplating processing). The entire surface of the third sintered electrode layer 51 is covered with the third plated layer 52. The fourth plated layer 53 is formed on the third plated layer 52 by plating processing (e.g., electroplating processing). The entire surface of the third plated layer 52 is covered with the fourth plated layer 53. Each of the conductor portions 5a and 5b includes a third sintered electrode layer 51, a third plated layer 52, and a fourth plated layer 53.

The first sintered electrode layer 31, the second sintered electrode layer 32, and the third sintered electrode layer 51 are formed by sintering the conductive paste applied onto the surface of the element body 2. The first sintered electrode layer 31, the second sintered electrode layer 32, and the third sintered electrode layer 51 are formed by heating the conductive paste. Each of the sintered electrode layers 31, 32, and 51 is, a layer formed by sintering a metallic component (metallic powder) included in the conductive paste. In this embodiment, each of the sintered electrode layers 31, 32, and 51 is a sintered metallic layer made of Cu. Each of the sintered electrode layers 31, 32, and 51 may be a sintered metallic layer made of Ni. The conductive paste may include powder made of metal (e.g., Cu or Ni), a glass component, an organic binder, and an organic solvent.

In this embodiment, the first and third plated layers 33 and 52 are Ni plated layers formed by Ni plating processing. Each of the first and third plated layers 33 and 52 may be a Sn-plated layer, a Cu-plated layer, or an Au-plated layer. The second and fourth plated layers 34 and 53 are Sn-plated layers formed by Sn plating processing. The second and fourth plated layers 34 and 53 may be Cu-plated layers or Au-plated layers.

The first sintered electrode layer 31 and the second sintered electrode layer 32 of each of the external electrodes 3 and the third sintered electrode layer 51 of each of the external electrodes 5 include a void 30 as illustrated in FIGS. 8 and 9. For example, a component obtained when the organic binder included in the conductive paste is gasified is included in the void 30. In this embodiment, a space having a maximum diameter of 10 μm or less is defined as the void 30. In FIGS. 8 and 9, the sectional shape of the void 30 is schematically indicated by an ellipse. The actual shape of the void 30 is not limited to an ellipsoid.

The void fraction of each of the first sintered electrode layer 31 and the third sintered electrode layer 51 is larger than the void fraction of the second sintered electrode layer 32. In this embodiment, the void fraction of the first sintered electrode layer 31 is substantially the same as the void fraction of the third sintered electrode layer 51. In this embodiment, the void fraction of each of the first sintered electrode layer 31 and the third sintered electrode layer 51 is 0.2 to 1.0%, and the void fraction of the second sintered electrode layer 32 is 0.02 to 0.18%. The void fraction of the first sintered electrode layer 31 may be different from the void fraction of the third sintered electrode layer 51.

The void fraction of each of the first sintered electrode layer 31, the second sintered electrode layer 32, and the third sintered electrode layer 51 can be obtained by, for example, the following method.

A cross-sectional photograph including the first sintered electrode layer 31, the second sintered electrode layer 32, and the third sintered electrode layer 51 is obtained. The cross-sectional photograph is obtained by, for example, by the following method. The feedthrough capacitor 1 is cut along a plane which is parallel to the pair of principal surfaces 2a and is located at an equal distance from the pair of principal surfaces 2a. A cut plane including the first sintered electrode layer 31, the second sintered electrode layer 32, and the third sintered electrode layer 51 is captured by a scanning electron microscope. Based on the obtained cross-sectional photograph, the area of the void 30 in sample regions which are set for each of the first sintered electrode layer 31, the second sintered electrode layer 32, and the third sintered electrode layer 51 is calculated.

Each sample region of the first sintered electrode layer 31, the second sintered electrode layer 32, and the third sintered electrode layer 51 has, for example, a rectangular shape. The length of a long side of each sample region is, for example, 250 μm, and the length of a short side of each sample region is 5 μm. In this case, the area of each sample region is 1250 μm². The sample region of the first sintered electrode layer 31 is set to, for example, the following position. One long side of the sample region coincides with the position of the corresponding end surface 2b on the cross-sectional photograph, and the bisector of the long side of the sample region coincides with a central line of the corresponding end surface 2b on the cross-sectional photograph. The sample region of the second sintered electrode layer 32 is set to, for example, the following position. One long side of the sample region coincides with the position of the surface of the second sintered electrode layer 32 on the cross-sectional photograph, and the bisector of the long side of the sample region coincides with the central line of the corresponding end surface 2b on the cross-sectional photograph. The sample region of the third sintered electrode layer 51 is set to, for example, the following position. One long side of the sample region coincides with the position of the side surface 2c on the cross-sectional photograph, and the bisector of the long side of the sample region coincides with the central line of the side surface 2c on the cross-sectional photograph.

The void fraction in the first sintered electrode layer 31 is a value obtained by dividing the area of the void 30 included in the sample region of the first sintered electrode layer 31 by the area of the sample region of the first sintered electrode layer 31 and representing the obtained quotient in percentage. The void fraction of the second sintered electrode layer 32 is a value obtained by dividing the area of the void 30 included in the sample region of the second sintered electrode layer 32 by the area of the sample region of the second sintered electrode layer 32 and representing the obtained quotient in percentage. The void fraction of the third sintered electrode layer 51 is a value obtained by dividing the area of the void 30 included in the sample region of the third sintered electrode layer 51 by the area of the sample region of the third sintered electrode layer 51 and representing the obtained quotient in percentage.

In the feedthrough capacitor 1, the void fraction of each of the first sintered electrode layer 31 and the third sintered electrode layer 51 is larger than the void fraction of the second sintered electrode layer 32. A conductive paste in which a distribution of metallic particles is sparse can be used to form the first and third sintered electrode layers 31 and 51, as compared with a conductive paste used to form the second sintered electrode layer 32. As the distribution of metallic particles is sparser, a gas generated when the conductive paste is heated tends to pass through the metallic particles. In this case, the gas tends not to be stagnant between the first sintered electrode layer 31 and the element body 2 and between the third sintered electrode layer 51 and the element body 2. Therefore, the bonding area between the external electrode 3 and the element body 2 and the bonding area between the external electrode 5 and the element body 2 are secured. The external electrodes 3 and 5 tend not to be separated from the element body 2. When the external electrodes 3 and 5 tend not to be separated from the element body 2, the production yield of the feedthrough capacitor 1 is improved.

In the external electrode 3, the second sintered electrode layer 32 having a void fraction smaller than the void fraction of the first sintered electrode layer 31 is disposed on the first sintered electrode layer 31. Therefore, infiltration of the plating solution into the element body 2 is suppressed without increasing the resistance of the feedthrough capacitor 1. Consequently, in the feedthrough capacitor 1, cracking tends not to occur in the element body 2 and the external electrodes 3 and 5 tend not to be separated from the element body 2, without increasing the resistance.

In the feedthrough capacitor 1, the void fraction of each of the first and third sintered electrode layers 31 and 51 is 0.2 to 1.0%, and the void fraction of the second sintered electrode layer 32 is 0.02 to 0.18%. Therefore, in the feedthrough capacitor 1, cracking further tends not to occur in the element body 2 and the external electrodes 3 and 5 further tend not to be separated from the element body 2.

The width of the second portion of each of the internal electrodes 9 is smaller than the width of the first portion of each of the internal electrodes 7. In general, as the width of a portion of an internal electrode that is exposed to the element body 2 decreases, a path through which a plating solution infiltrates is narrower, so that infiltration of the plating solution into the element body 2 is suppressed. When the second portion of each of the internal electrodes 9 is smaller than the width of the first portion of each of the internal electrodes 7, infiltration of the plating solution into the element body 2 is suppressed as compared with when the second portion of each of the internal electrodes 9 is equal to or more than the width of the first portion of each of the internal electrodes 7. When the width of the first portion of each of the internal electrodes 7 is larger than the width of the second portion of each of the internal electrodes 9, the connection area between the external electrode 3 and the internal electrode 7 is secured as compared with when the width of the first portion of each of the internal electrodes 7 is equal to or less than the width of the second portion of each of the internal electrodes 9. Therefore, in the feedthrough capacitor 1, an increase in resistance is suppressed and occurrence of cracking is further suppressed.

When the feedthrough capacitor 1 is solder-mounted on the electronic device 20, a force may act on the bonding portion between the electronic device 20 and the external electrode 3 and on the bonding portion between the electronic device 20 and the external electrode 5. When the surface area of the conductor portion 5b is smaller than the surface area of the conductor portion 3b, the force per unit area acting on the bonding portion between the electronic device 20 and the external electrode 5 tends to be larger than the force per unit area acting on the bonding portion between the electronic device 20 and the external electrode 3, as compared with when the surface area of the conductor portion 5b is equal to or more than the surface area of the conductor portion 3b. When the surface roughness of the conductor portion 5b is larger than the surface roughness of the conductor portion 3b, the bonding strength of bonding between the external electrode 5 and the solder is larger than the bonding strength of bonding between the external electrode 3 and the solder, as compared with when the surface roughness of the conductor portion 5b is equal to or less than the surface roughness of the conductor portion 3b. Therefore, even when the force per unit area acting on the bonding portion between the electronic device 20 and the external electrode 5 is larger than the force per unit area acting on the bonding portion between the electronic device 20 and the external electrode 3, the feedthrough capacitor 1 tends not to be separated from the electronic device 20.

When the surface roughness of the conductor portion 5b is larger than the surface roughness of the conductor portion 3b, the melted solder tends not to climb up each external electrode 5, as compared with when the surface roughness of the conductor portion 5b is equal to or less than the surface roughness of the conductor portion 3b. When the melted solder tends not to climb up each external electrode 5, the size of the solder fillet 23 formed on each external electrode 5 is small, as compared with when the melted solder tends to climb up each external electrode 5. Therefore, in the feedthrough capacitor 1, the packaging density in the third direction D3 is reduced.

Each of the external electrodes 3 may include, for example, only the conductor portion 3b. Each of the external electrodes 5 may include, for example, only the conductor portion 5b.

The number of external electrodes 5 is not limited to "2", but instead may be "1", or "3" or more. It is only required that each of the external electrodes 5 is disposed on at least one of the pair of side surfaces 2c. When the external electrode 5 is disposed only on one of the side surfaces 2c, the number of external electrodes 5 is "1". In this case, each of the internal electrodes 9 includes one second portion exposed to one of the side surfaces 2c.

The element body 2 may have any shape as long as the element body 2 includes a pair of end surfaces 2b opposing each other, and at least one side surface 2c located between the pair of end surfaces 2b. The shape of the element body 2 is not limited to a rectangular parallelepiped shape.

Although the embodiments and modifications of the present invention have been described above, the present invention is not necessarily limited to the embodiments and modifications, and the embodiment can be variously changed without departing from the scope of the invention.

What is claimed is:

1. A feedthrough capacitor comprising:
   an element body including a pair of end surfaces opposing each other, and at least one side surface located between the pair of end surfaces;
   a pair of first external electrodes disposed on the pair of end surfaces, respectively;
   a second external electrode spaced apart from the pair of first external electrodes and disposed on the side surface;
   a first internal electrode disposed in the element body and including a pair of first portions exposed to the pair of end surfaces; and
   a second internal electrode disposed in the element body to oppose the first internal electrode and including a second portion exposed to the side surface, wherein
   each of the first external electrodes includes:
      a first sintered electrode layer covering the corresponding first portion and being connected to the corresponding first portion;
      a second sintered electrode layer disposed on the first sintered electrode layer; and
      a plated layer disposed on the second sintered electrode layer,
   the second external electrode includes:
      a third sintered electrode layer covering the second portion and being connected to the second portion; and
      a plated layer disposed on the third sintered electrode layer,
   the first, second, and third sintered electrode layers include a void,
   a void fraction of each of the first and third sintered electrode layers is larger than a void fraction of the second sintered electrode layer,
   the void fraction of each of the first and third sintered electrode layers is 0.2 to 1.0%, and
   the void fraction of the second sintered electrode layer is 0.02 to 0.18%.

2. The feedthrough capacitor according to claim 1, wherein
   a width of the second portion is smaller than a width of each of the first portions.

3. A feedthrough capacitor comprising:
   an element body including a pair of end surfaces opposing each other, and at least one side surface located between the pair of end surfaces;
   a pair of first external electrodes disposed on the pair of end surfaces, respectively;
   a second external electrode spaced apart from the pair of first external electrodes and disposed on the side surface;
   a first internal electrode disposed in the element body and including a pair of first portions exposed to the pair of end surfaces; and
   a second internal electrode disposed in the element body to oppose the first internal electrode and including a second portion exposed to the side surface, wherein each of the first external electrodes includes:
- a first sintered electrode layer covering the corresponding first portion and being connected to the corresponding first portion;
- a second sintered electrode layer disposed on the first sintered electrode layer; and
- a plated layer disposed on the second sintered electrode layer, the second external electrode includes:
- a third sintered electrode layer covering the second portion and being connected to the second portion; and
- a plated layer disposed on the third sintered electrode layer, the first, second, and third sintered electrode layers include a void, a void fraction of each of the first and third sintered electrode layers is larger than a void fraction of the second sintered electrode layer, each of the first external electrodes includes a first conductor portion located on the corresponding the end surface, the second external electrode includes a second conductor portion located on the side surface, a surface area of the second conductor portion is smaller than a surface area of the first conductor portion, and a surface roughness of the second conductor portion is larger than a surface roughness of the first conductor portion.

4. The feedthrough capacitor according to claim 3, wherein
a width of the second portion is smaller than a width of each of the first portions.

* * * * *